US012768413B2

(12) United States Patent
Johnson et al.

(10) Patent No.: US 12,768,413 B2
(45) Date of Patent: Oct. 20, 2026

(54) BRAKE COOLING SYSTEM AND METHOD TO REDUCE ENERGY CONSUMPTION IN A WORK MACHINE

(71) Applicant: Caterpillar Inc., Peoria, IL (US)

(72) Inventors: Steven Edward Johnson, Metamora, IL (US); Sorin Gigi Toader, Oswego, IL (US); Christopher Demick, Wake Forest, NC (US)

(73) Assignee: Caterpillar Inc., Peoria, IL (US)

( * ) Notice: Subject to any disclaimer, the term of this patent is extended or adjusted under 35 U.S.C. 154(b) by 21 days.

(21) Appl. No.: 18/971,850

(22) Filed: Dec. 6, 2024

(65) Prior Publication Data

US 2026/0160308 A1 Jun. 11, 2026

(51) Int. Cl.
*F16D 65/78* (2006.01)
*F16D 65/853* (2006.01)
*F16D 66/00* (2006.01)

(52) U.S. Cl.
CPC ........... *F16D 65/78* (2013.01); *F16D 65/853* (2013.01); *B60B 2900/513* (2013.01); *F16D 2065/783* (2013.01); *F16D 2065/787* (2013.01); *F16D 2066/001* (2013.01)

(58) Field of Classification Search
CPC .. F16D 65/78; F16D 65/853; F16D 2065/783; F16D 2065/787; F16D 2066/001; B60B 2900/513
See application file for complete search history.

(56) References Cited

U.S. PATENT DOCUMENTS

| | | | | |
|---|---|---|---|---|
| 6,030,314 | A * | 2/2000 | Brooks | B60T 5/00 477/92 |
| 6,419,054 | B1 | 7/2002 | Schulba | |
| 7,036,640 | B2 * | 5/2006 | Spielman | F16D 65/78 188/264 D |
| 8,006,813 | B2 | 8/2011 | James et al. | |
| 8,739,932 | B2 * | 6/2014 | Ramler | F01M 1/10 137/15.01 |
| 9,897,253 | B2 * | 2/2018 | Delp | F16N 7/40 |
| 11,028,892 | B2 | 6/2021 | Jeffery | |
| 11,320,013 | B1 | 5/2022 | Fisher et al. | |
| 11,448,362 | B2 * | 9/2022 | West | F16D 65/78 |
| 2023/0182697 | A1 | 6/2023 | Audhav et al. | |
| 2026/0109586 | A1 * | 4/2026 | Fung | B66F 11/044 |

FOREIGN PATENT DOCUMENTS

FR 2796024 B1 1/2001

* cited by examiner

*Primary Examiner* — Dustin T Nguyen

(57) ABSTRACT

Typically, work machines, such as tractors and heavy-duty machinery, require brake cooling systems for maintaining the performance of work machines, especially during high-stress conditions like heavy braking. Common brake cooling systems can waste high amounts of energy. Accordingly, a brake cooling system, the system comprises: a brake set; a sensor configured to detect parameter values of a work machine; a machine controller that includes a processor configured to receive one or more parameter values from the sensor, convert the parameter values into a flow request, determine a pump desired speed required to supply the flow request, and generate a speed command; and a fluid flow circuit system including a power source and a pump coupled to the power source, the fluid flow circuit system in communication with the machine controller to receive the speed command and to actuate a fluid flow into the brake set in response thereto is disclosed.

19 Claims, 6 Drawing Sheets

BRAKE COOLING SYSTEM AND METHOD TO REDUCE ENERGY CONSUMPTION IN A WORK MACHINE

TECHNICAL FIELD

The embodiments described herein are generally directed to a brake cooling system and method, and, more particularly, to a brake cooling system and method to reduce energy consumption in a work machine.

BACKGROUND

Most brake cooling systems, particularly those in work machines, rely on high brake cooling flow to dissipate heat generated during braking, leading to significant energy inefficiencies. These brake cooling systems typically require large amounts of cooling oil to be forced through brake components, necessitating powerful pumps or increased vehicle speeds to achieve adequate cooling. This reliance on high flow rates not only increases energy consumption but can also result in greater hydraulic drag, further compounding the inefficiencies. As work machines become heavier and more powerful, the demand for effective brake cooling grows, creating a cycle where more energy is consumed without proportionate gains in performance or safety.

Further, typical brake cooling systems are either driven by the engine or an electric motor and the pump speed is held constant throughout the work machine work cycle and does not provide the most energy efficient system. This design can lead to increased fuel or energy consumption, as the system operates at a constant speed regardless of demand. Consequently, it often runs at higher levels than necessary, which can drain battery power more quickly in electric models. By not optimizing pump speed based on actual cooling needs, the system can waste significant energy, reducing overall efficiency and increasing operational costs. For at least these reasons, a brake cooling system can become inefficient. Accordingly, a brake cooling system and method to reduce energy consumption in a work machine has been developed to increase efficiency in energy usage for brake cooling systems. For example, U.S. Pat. No. 11,320,013 B1, published on Apr. 21, 2022, and U.S. Pat. No. 8,006,813 B2, published on May 29, 2008, describe different brake cooling systems. The present disclosure is directed toward overcoming one or more of the problems discovered by the inventor.

SUMMARY

In an embodiment, a brake cooling system, the system comprises: a brake set; a sensor configured to detect parameter values of a work machine; a machine controller that includes a processor configured to receive one or more parameter values from the sensor, convert the parameter values into a flow request, determine a pump desired speed required to supply the flow request, and generate an electric motor speed command; and a fluid flow circuit system including a power source and a pump coupled to the power source, the fluid flow circuit system in communication with the machine controller to receive the speed command and to actuate a fluid flow into the brake set in response thereto.

In an embodiment, a work machine having a brake cooling system, the brake cooling system comprises: a brake set; a sensor configured to detect parameter values of the work machine; a machine controller that includes a processor configured to receive one or more parameter values from the sensor, convert the parameter values into a flow request, determine a pump speed required to supply the flow request, and generate an electric motor speed command; and a fluid flow circuit system including a power source and a pump coupled to the power source, the fluid flow circuit system in communication with the machine controller to receive the speed command and to actuate a fluid flow into the brake set in response thereto.

In an embodiment, a method for cooling a brake fluid, the method comprises: detecting parameter values from a sensor of a work machine; receiving the detected parameter values at a machine controller that includes a processor; converting the parameter values into a flow request; determining a pump desired speed required to supply the flow request; generating a speed command corresponding to the pump speed; transmitting the speed command to a fluid flow circuit system; and actuating a fluid flow into a brake system via the fluid flow circuit system in response to the speed command, the fluid flow circuit system comprising a power source and a pump coupled to the power source.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
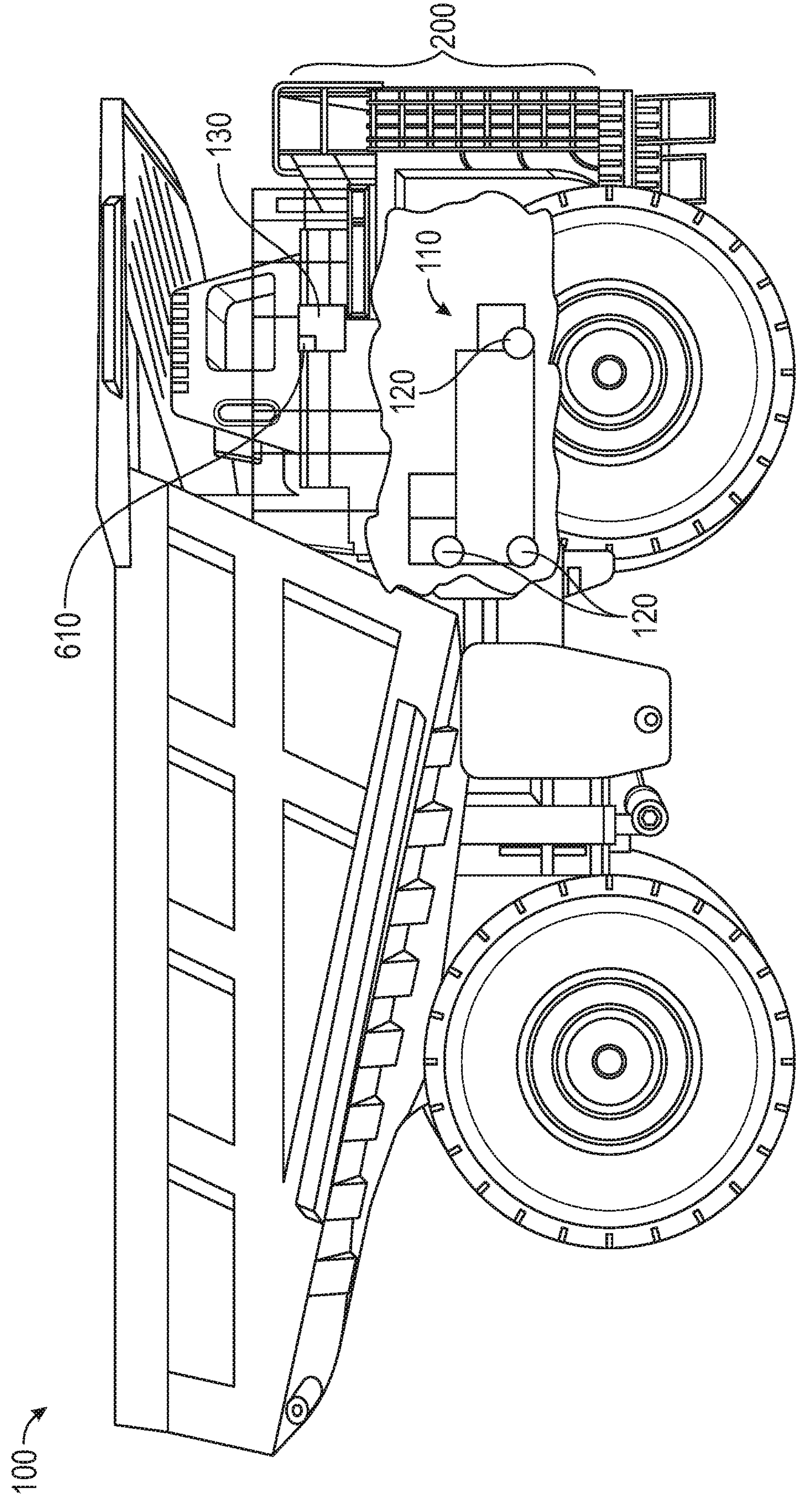
FIG. 1 illustrates a side view of a work machine with a brake cooling system, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

FIG. 1 illustrates a side view of a work machine with a brake cooling system, according to an embodiment. Work machine 100 is illustrated as a mining truck. However, work machine 100 may be any vehicle or engine that utilizes a brake cooling system. Other examples of work machine 100 include, without limitation, an excavator, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like. Work machine 100 may be operated by a human (e.g., locally or remotely) and/or by an autonomous system.

Figure 2:
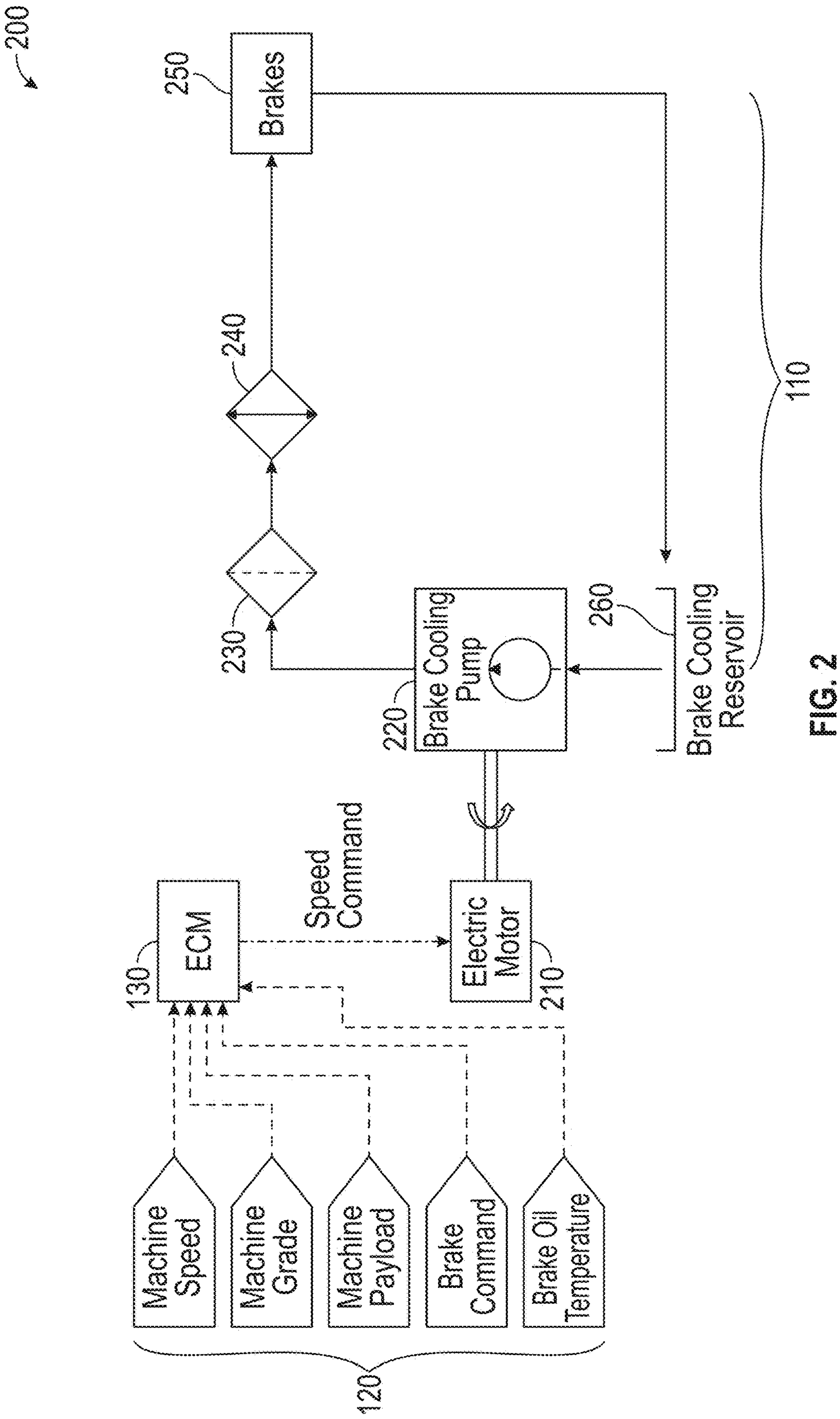
FIG. 2 illustrates an example of a brake cooling system driven by a dedicated electric motor, according to an embodiment.

In the illustrated example, work machine 100 includes a brake cooling system 200, which is configured to circulate cooling oil through a fluid flow circuit system 110 of work machine 100. Brake cooling system 200 comprises a power source such as a dedicated electric motor 210, a fluid flow circuit system 110, one or more sensors 120, a machine controller 130, and/or a processor 610. For example, brake cooling system 200 collects parameter values from one or more existing sensors 120 integrated within brake cooling system 200 components of work machine 100, one or more existing sensors integrated within other systems of work machine 100, and one or more existing machine controllers of work machine 100. The gathered parameter values are then transmitted in real-time to machine controller 130. Machine controller 130 uses parameter values to convert parameter values into a flow request to determine a pump 220 desired speed to circulate the cooling oil into fluid flow circuit system 110. As shown in FIG. 2 example, machine controller 130 communicates a speed command with dedicated electric motor 210 to provide power based on the desired speed of pump 220.

Further, this real-time communication between existing sensors 120 in the components of brake cooling system 200 and machine controller 130 provide data to processor 610 to monitor the condition of work machine 100 to determine pump 220 desired speed to actuate the fluid flow being circulated into fluid flow circuit system 110. Moreover, processor 610 can be independent and/or separate from machine controller 130. It should be understood that the present embodiments may be compatible with any type of work machine 100 or brake cooling system 200.

Figure 6:
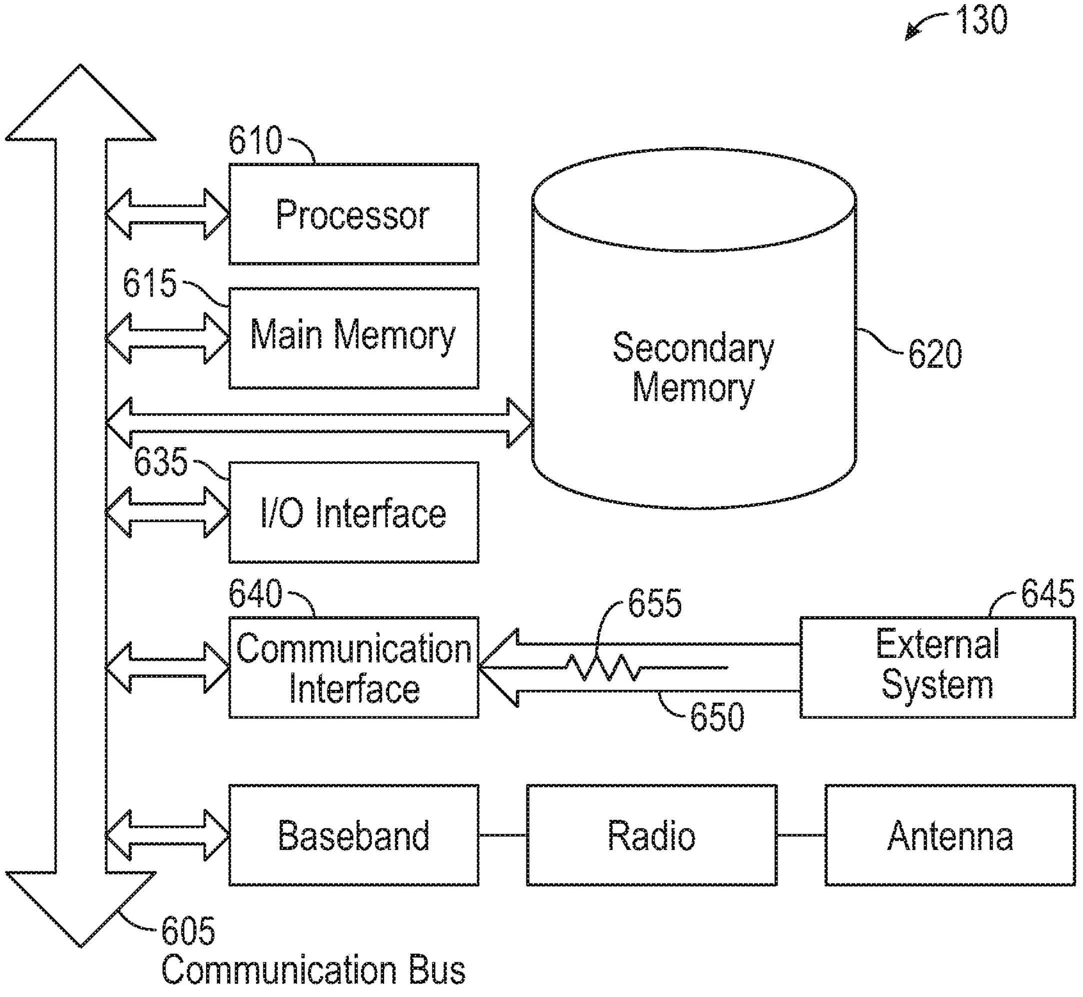
FIG. 6 illustrates an example architecture of a machine controller, according to an embodiment.

As previously described, machine controller 130 ensures that brake set 250 receives enough fluid flow to maintain brake set 250 in optimal temperature conditions through converting the parameter values into a flow request and determining a pump 220 desired speed to supply the flow request based on a desired speed. Further, FIG. 6 illustrates in detail the components of machine controller 130.

FIG. 2 illustrates an example of a brake cooling system driven by a dedicated electric motor, according to an embodiment. As previously mentioned in FIG. 1, brake cooling system 200 comprises a fluid flow circuit system 110, one or more sensors 120, a machine controller 130, and/or a processor 610. In FIG. 2, brake cooling pump 220 uses a dedicated electric motor 210 as power source and pump 220 speed can be controlled independently of the other hydraulic systems. This provides the ability to utilize machine sensors 120 to understand the travel state of work machine 100 and determine the current (or potential) heat generation in brake cooling system 200 such that machine controller 130 can control power source speed that rotates pump 220 to provide an output flow that is required.

FIG. 2 illustrates in detail the components of brake cooling system 200. Brake cooling system 200 in work machine 100 is designed to ensure the reliable and efficient cooling of brake set 250. Work machine 100 communicates with machine controller 130 via sensors 120. Sensors 120 monitor critical parameters like speed, grade, payload, brake command, and brake oil temperature associated with work machine 100. Brake cooling system 200 in work machine 100 relies on a variety of sensors 120 to ensure optimal performance and reliability. These sensors 120 provide critical data to machine controller 130, which uses this information to convert the parameter values into a flow request to generate a speed command that can be communicated to a power source like dedicated electric motor 210 or other components based on the design of brake cooling system 200.

Brake cooling system 200 comprises a fluid flow circuit system 110 that provides a fluid flow to brake set 250. The fluid flow can be cooling oil but can include other fluids. Fluid flow circuit system 110 can include a power source and one or more pumps 220 (220A and/or 220B) to transport the cooling oil to brake set 250. As well, fluid flow circuit system 110 can include a filtering system 230, a cooling unit 240, and a brake cooling reservoir 260.

Pump 220 circulates coolant oil, ensuring that heat generated during braking in brake set 250 is effectively dissipated. Pump 220 can be a displacement pump, which moves a fixed volume of fluid with each cycle, or a centrifugal pump, which relies on rotational energy to create flow. Pump 220 can be any commercially available pump 220 compatible with brake cooling system 200.

The power source of fluid flow circuit system 110 depends on the design of brake cooling system 200. The power source of fluid flow circuit system 110 is closely tied to the design of brake cooling system 200, as effective cooling is crucial for maintaining optimal fluid temperatures and performance of brake set 250. The power source of fluid flow circuit system 110 can include dedicated electric motor 210 directly communicated to machine controller 130. Another example provided in FIG. 3 includes a gas or fuel engine 310 that may not be directly in communication with machine controller 130. As well, the power source can include an electric motor 410 as shown in FIG. 4. The power source can directly power pump 220 or connect with other intermediate components to power pump 220.

Additionally, fluid flow circuit system 110 can comprise a flow path connected to brake set 250 to transport the cooling oil. The flow path in brake cooling system 200 directs the movement of coolant oil around brake set 250 components to dissipate heat generated during braking. By optimizing the flow path, brake cooling system 200 enhances heat transfer efficiency, helping to maintain optimal temperatures and prevent brake fade.

Filtering system 230 in fluid flow circuit system 110 of brake cooling system 200 serves to remove contaminants and debris from the coolant coming from pump 220, ensuring that only clean fluid or air reaches the brake components. By preventing the buildup of particulates, the filter helps maintain optimal thermal efficiency and protects the integrity of the cooling system. This function is helpful for preventing damage to brake components and ensuring consistent performance over time.

Cooling unit 240 in fluid flow circuit system 110 of brake cooling system 200 can help dissipate heat from the brake components or entering brake set 250, maintaining optimal operating temperatures. Cooling unit 240 can consist of a heat exchanger that allows the transfer of heat from the brake fluid to a cooling medium, such as coolant. By facilitating this heat exchange, cooling unit 240 prevents overheating, which can lead to reduced braking efficiency and increased wear on brake set 250 components.

Brake cooling reservoir 260 in fluid flow circuit system 110 of brake cooling system 200 serves as a storage tank for the coolant coming from brake set 250, ensuring a steady supply during operation. Brake cooling reservoir 260 can help maintain consistent fluid levels, compensating for any changes due to temperature fluctuations or evaporation. Additionally, brake cooling reservoir 260 can aid in the separation of air bubbles from the coolant, promoting better thermal performance and reducing the risk of vapor lock.

Figure 3:
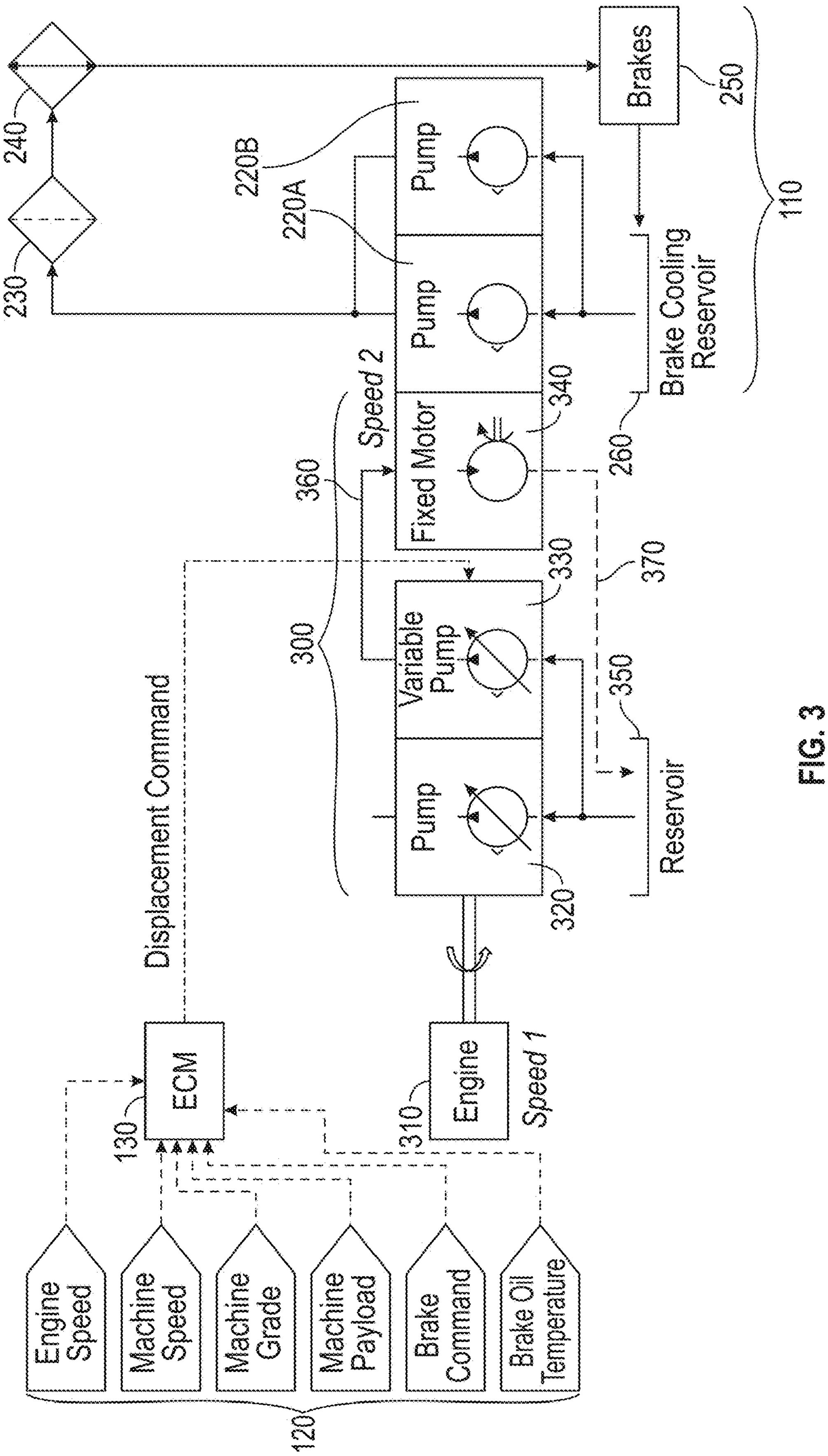
FIG. 3 illustrates an example of a brake cooling system driven by an engine, according to an embodiment.
Figure 4:
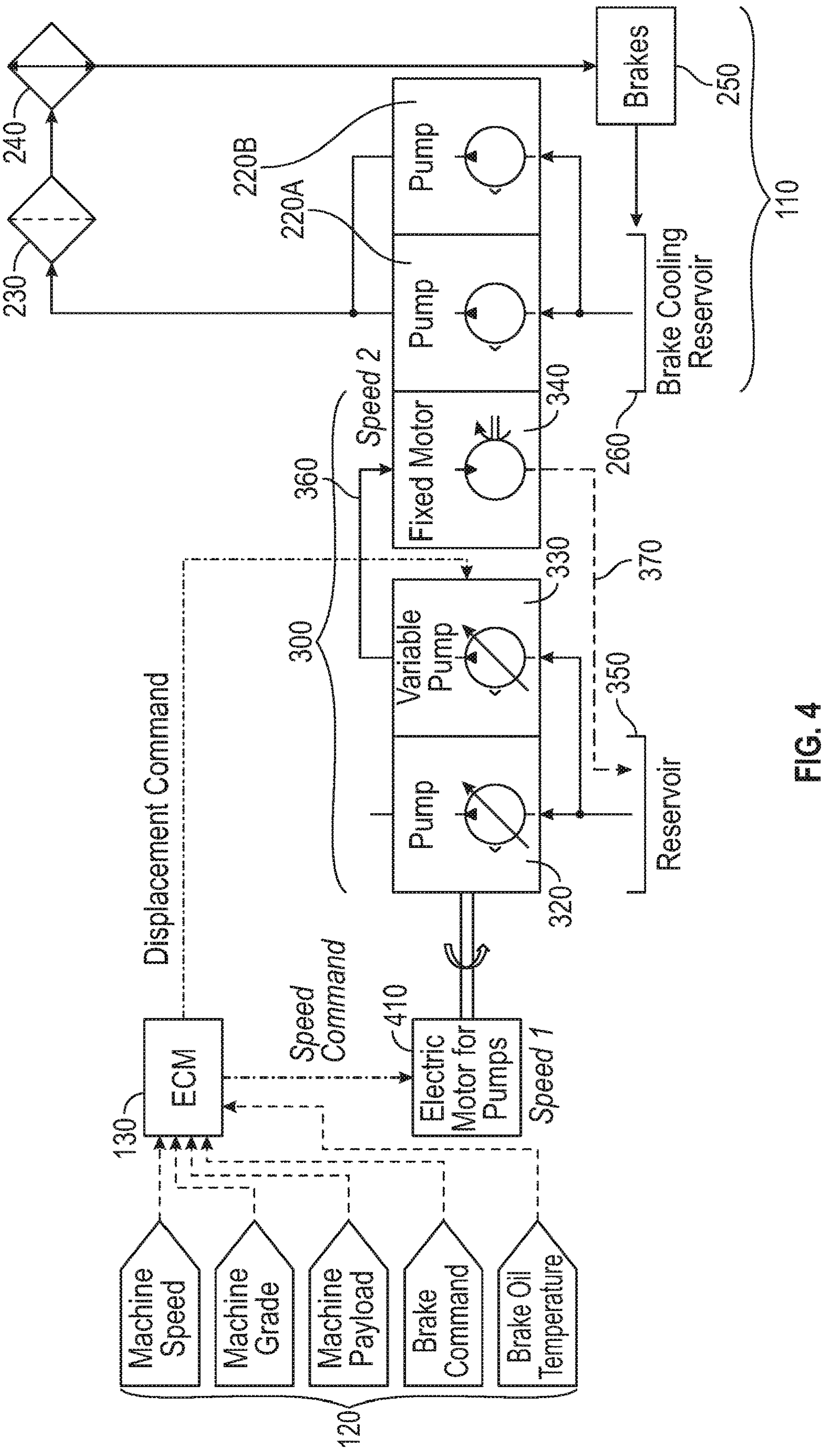
FIG. 4 illustrates an example of a brake cooling system driven by an electric motor, according to an embodiment.

FIG. 3 illustrates an example of a brake cooling system 200 driven by an engine 310, according to an embodiment. Different from the example in FIG. 2, brake cooling system 200 utilizes fuel engine 310 as a power source. In addition, brake cooling system 200 can comprise a second fluid flow circuit system 300. Second fluid flow circuit system 300 comprises a fixed motor 340 between fuel engine 310 and pump 220. As well, brake cooling system 200 with a second fluid flow circuit system 300 can include secondary pump 320, variable displacement pump 330, and secondary reservoir 350 to receive cooling from fixed motor 340 through fluid connection 370. In this example, machine controller 130 can communicate the displacement command directly to variable displacement pump 330.

Brake cooling system 200 with second fluid flow circuit system 300 is characterized by a two-part arrangement, second fluid flow circuit system 300 including secondary pump 320 powered by fuel engine 310, and variable displacement pump 330 that is configured to drive fixed motor 340 through fluid connection 360 and is coupled to pump 220 of first fluid flow circuit system. Variable displacement pump 330 is then controlled by machine controller 130 through a number of inputs that allow to efficiently run brake cooling system 200 to meet the needs of brake set 250. The system is not based purely on brake oil temperature as there is a need to predict braking needs due to potential lag in system requirements.

FIG. 4 illustrates an example of a brake cooling system 200 driven by an electric motor, according to an embodiment. Similar to FIG. 3, brake cooling system 200 can comprise a second fluid flow circuit system 300. However, brake cooling system 200 utilizes an electric motor 410. Second fluid flow circuit system 300 comprises a fixed motor 340 between electric motor 410 and pump 220. As well, brake cooling system 200 with a second fluid flow circuit system 300 can include secondary pump 320, variable displacement pump 330, and secondary reservoir 350 to receive cooling from fixed motor 340 through fluid connection 370. In this example, machine controller 130 can communicate the displacement command directly to variable displacement pump 330 and/or speed command with electric motor 410.

Figure 5:
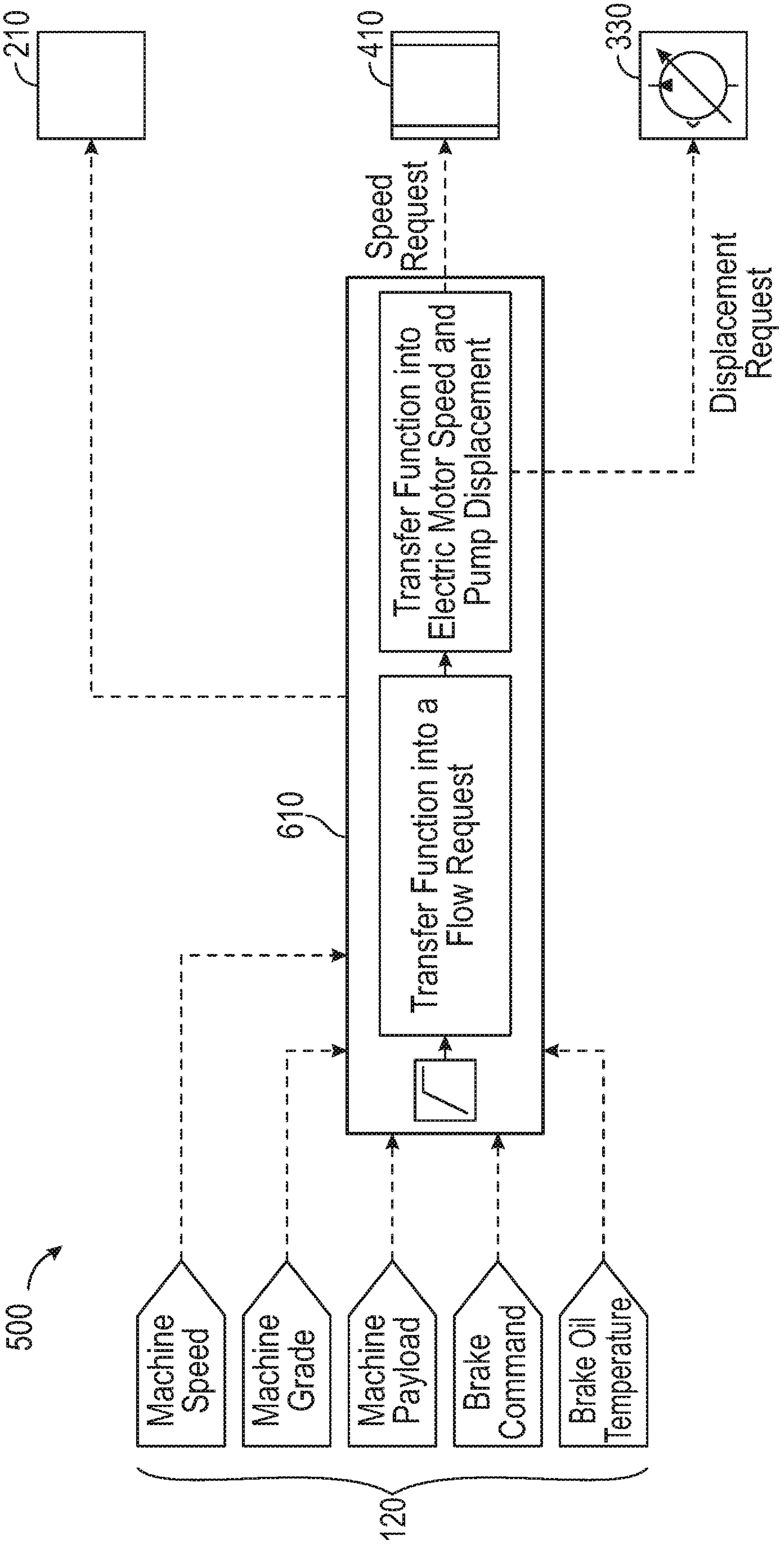
FIG. 5 illustrates a brake cooling system control logic process, according to an embodiment.

FIG. 5 illustrates a brake cooling system 200 control logic process 500, according to an embodiment. Control logic process 500 references various sensor 120 inputs to determine the proper brake cooling pump 220 desired speed and/or variable displacement pump 330 displacement to meet cooling demands for brake set 250 and conserve energy. This allows the brake cooling pump 220 to output flow between a minimum flow and maximum flow, depending on the cooling demands, and without the need for a thermal bypass valve around cooler unit 340.

In simple terms, process 500 illustrates sensors 120 detecting different work machine 100 parameter values such as machine speed, machine grade, machine payload, brake command, and brake oil temperature. Through machine controller 130, processor 610 of brake cooling system 200 receives the parameter values and transfers the functions related to these parameter values into a flow request, as shown in FIG. 5. After, processor 610 determines a pump 220 desired speed required to supply the flow request needed to dissipate heat from brake set 250 based on the activity or parameter value related to work machine 100. Finally, processor 610 generates a speed command that can be communicated directly to dedicated electric motor 210, electric motor 410, and/or displacement command to other components such as variable displacement pump 330.

FIG. 6 illustrates an example architecture of a machine controller 130, according to an embodiment. Controller 130 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used with controller 130 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 610 may be connected to a communication bus 605. Communication bus 605 may include a data channel for facilitating information transfer between storage and other peripheral components of machine controller 130. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Machine controller 130 may comprise main memory 615. Main memory 615 provides storage of instructions and data for programs executing on processor 610, such as one or more of the processes or functions discussed herein. It should be understood that programs stored in the memory and executed by processor 610 may be written and/or compiled according to any suitable language, including without limitation C/C++, Java, JavaScript, Perl, Python, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Machine controller 130 may comprise secondary memory 620. Secondary memory 620 is a non-transitory computer-readable medium having computer-executable code and/or other data (e.g., software implementing any process or function described herein) stored thereon. In this description, the term "computer-readable medium" is used to refer to any non-transitory computer-readable storage media used to provide computer-executable code and/or other data to or within controller 130. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Machine controller 130 may comprise an input/output (I/O) interface 635. I/O interface 635 provides an interface between one or more components of controller 130 and one or more input and/or output devices. For example, I/O interface 635 may receive the output of one or more sensors, and/or output control signals to one or more of the components of work machine 100.

Machine controller 130 may comprise a communication interface 640. Communication interface 640 allows signals, such as data and software, to be transferred between machine controller 130 and external devices, networks, or other information sources and/or destinations (e.g., receiver (s)). For example, computer-executable code and/or data may be transferred to machine controller 130, over one or more networks, from a network server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing machine controller 130 with a network or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network, or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 620. Computer-executable code can also be received from an external system 645 via communication interface 640 and stored in main memory 615 and/or secondary memory 620. Such computer-executable code, when executed by processor(s) 610, enable machine controller 130 to perform the various processes or functions disclosed herein.

INDUSTRIAL APPLICABILITY

In some industrial contexts, such as construction, mining, farming, forestry, and the like, work machine 100 may operate with brake sets that use brake cooling systems to dissipate heat from the brake set. Brake cooling systems may have large amounts of energy consumption due to the high amount of flow required to provide proper brake cooling and the use of gear pumps for size, cost benefits, and robustness to contamination generated by the brake set. Current brake cooling systems are either driven by the engine or an electric motor and the pump speed is held constant throughout work machine 100 work cycle and does not provide the most energy efficient system.

Accordingly, a brake cooling system 200 and method to reduce energy consumption in a work machine 100 is disclosed. Brake cooling system 200 includes a brake set 250; a sensor 120 configured to detect parameter values of a work machine 100. These parameter values from work machine 100 can be provided to a machine controller 130 that can include a processor 610 configured to receive one or more parameter values from sensor 120, convert the parameter values into a flow request, determine a pump 220 desired speed required to supply the flow request, and generate a dedicated electric motor 210 speed command. Further, brake cooling system 200 includes a fluid flow circuit system 110 including a power source and a pump 220 coupled to the power source, the fluid flow circuit system 110 in communication with machine controller 130 to receive the speed command and to actuate a fluid flow into brake set 250 in response thereto is disclosed.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in work machine 100, it will be appreciated that it can be implemented in various other types of machines, including non-work machines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A brake cooling system, the brake cooling system comprising:

a brake set;

a sensor configured to detect parameter values of a work machine;

a machine controller that includes a processor configured to receive one or more parameter values from the sensor, wherein the one or more parameter values are indicative of a grade and/or a payload associated with the work machine, convert the parameter values into a flow request, determine a pump desired speed required to supply the flow request, and generate an electric motor speed command; and a fluid flow circuit system including a power source and a pump coupled to the power source, the fluid flow circuit system in communication with the machine controller to receive the speed command and to actuate a fluid flow into the brake set in response thereto.

2. The brake cooling system of claim 1, wherein the power source is an electric motor in communication with the machine controller.

3. The brake cooling system of claim 1, wherein the fluid flow circuit system further comprises:

a flow path connected to the brake set;

a filtering system configured to filter the fluid flow coming from the flow path;

a cooling unit configured to cool the fluid flow coming from the flow path; and a brake cooling reservoir configured to receive a heated fluid from the brake set.

4. The brake cooling system of claim 1, further comprising:

a second fluid flow circuit system with a fixed motor between the power source and the fluid flow circuit system.

5. The brake cooling system of claim 4, wherein the power source is a diesel engine.

6. The brake cooling system of claim 4, wherein the power source is an electric motor.

7. The brake cooling system of claim 4, wherein the pump is a variable displacement pump configured to receive a displacement command from the machine controller.

8. The brake cooling system of claim 1, wherein the parameter values received by the machine controller comprise speed, grade, payload, brake command, and brake oil temperature associated with the work machine.

9. A work machine having a brake cooling system, the brake cooling system comprising:

a brake set;

a sensor configured to detect parameter values of the work machine;

a machine controller that includes a processor configured to:

receive one or more parameter values from the sensor, convert the parameter values into a flow request, determine a pump desired speed required to supply the flow request, and generate an electric motor speed command;

a first fluid flow circuit system including a power source and a first pump coupled to the power source, the first fluid flow circuit system in communication with the machine controller to receive the speed command and to actuate a fluid flow into the brake set in response thereto; and a second fluid flow circuit system coupled to the first fluid flow circuit system, the second fluid flow circuit system including a fixed motor and a second pump coupled to the fixed motor;

wherein the machine controller operates the power source and the first pump based at least in part upon the one or more parameter values to cause the fixed motor to operate the second pump at the pump desired speed to produce the fluid flow into the brake set.

10. The work machine of claim 9, wherein the power source is an electric motor configured to receive the speed command from the machine controller.

11. The work machine of claim 9, wherein the power source is a diesel engine.

12. The work machine of claim 9, wherein the power source is an electric motor.

13. The work machine of claim 9, wherein the first pump is a variable displacement pump configured to receive a displacement command from the machine controller.

14. The work machine of claim 9, wherein the parameter values received by the machine controller comprise speed, grade, payload, brake command, and brake oil temperature associated with the work machine.

15. A method for cooling a brake fluid, the method comprising:

detecting parameter values from a sensor of a work machine, wherein the parameter values are indicative of a grade and/or a payload associated with the work machine;

receiving the detected parameter values at a machine controller that includes a processor;

converting the parameter values into a flow request;

determining a pump desired speed required to supply the flow request;

generating a speed command corresponding to the pump desired speed;

transmitting the speed command to a fluid flow circuit system; and actuating a fluid flow into a brake set via the fluid flow circuit system in response to the speed command, the fluid flow circuit system comprising a power source and a pump coupled to the power source.

16. The method of claim 15, wherein a second fluid flow circuit system comprises a fixed motor between the power source and the fluid flow circuit system.

17. The method of claim 16, wherein the power source is a diesel engine.

18. The method of claim 16, wherein the power source is an electric motor.

19. The method of claim 15, wherein the parameter values received by the machine controller comprise speed, grade, payload, brake command, and brake oil temperature associated with the work machine.

* * * * *